(12) United States Patent  
Arnabat Castellvi

(10) Patent No.: US 8,037,943 B2  
(45) Date of Patent: *Oct. 18, 2011

(54) FASTENING DEVICE FOR COUPLING OF BLADES IN AGRICULTURAL CULTIVATION MACHINES

(75) Inventor: Carles Arnabat Castellvi, Barcelona (ES)

(73) Assignee: Digger Tools, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 12/664,076

(22) PCT Filed: Jun. 5, 2008

(86) PCT No.: PCT/ES2008/000411  
§ 371 (c)(1),  
(2), (4) Date: Dec. 11, 2009

(87) PCT Pub. No.: WO2008/152167  
PCT Pub. Date: Dec. 18, 2008

(65) Prior Publication Data  
US 2010/0175901 A1    Jul. 15, 2010

(30) Foreign Application Priority Data  
Jun. 12, 2007   (ES) .................................. 200701613

(51) Int. Cl.  
*A01B 21/02* (2006.01)

(52) U.S. Cl. ........................ 172/540; 172/753

(58) Field of Classification Search ................. 172/123, 172/518, 540, 556, 753  
See application file for complete search history.

(56) References Cited

U.S. PATENT DOCUMENTS

| | | | | |
|---|---|---|---|---|
| 1,543,515 A * | 6/1925 | Pickard | ........................ | 172/540 |
| 2,341,830 A * | 2/1944 | Uddenborg | .................... | 172/550 |
| 3,362,482 A * | 1/1968 | Riddle | ........................... | 172/119 |
| 3,563,015 A * | 2/1971 | Renfroe | .......................... | 56/295 |
| 3,566,975 A * | 3/1971 | Howard et al. | ............... | 172/540 |
| 3,589,452 A * | 6/1971 | Haker et al. | ................... | 172/548 |
| 3,702,638 A * | 11/1972 | Takata | ........................... | 172/540 |
| 4,488,608 A * | 12/1984 | Berchem | ........................ | 175/374 |
| 4,750,320 A * | 6/1988 | Liebl | ................................ | 56/295 |
| 4,799,555 A * | 1/1989 | Badger | .......................... | 172/751 |
| 6,315,057 B1 * | 11/2001 | Borter | ........................... | 172/753 |
| 2008/0277127 A1 * | 11/2008 | Dixon | ........................... | 172/552 |

FOREIGN PATENT DOCUMENTS

| | | |
|---|---|---|
| EP | 1222844 A1 | 7/2002 |
| ES | 363807 A1 | 3/1971 |
| ES | 2190861 A1 | 8/2003 |
| FR | 2487157 A1 | 1/1982 |
| FR | 2501457 A1 | 9/1982 |

* cited by examiner

*Primary Examiner* — Robert Pezzuto  
*Assistant Examiner* — Jamie L McGowan  
(74) *Attorney, Agent, or Firm* — Richard M. Goldberg

(57) ABSTRACT

Fastening device for coupling of blades in agricultural cultivation machines, in particular, tilling machines such as rotary tillers, including an intermediate fastening element, formed by a solid body, which joins the blade to the rotary plate; the intermediate fastening element being equipped with a fastening arrangement for linking the fastening arrangement to the rotary plate; a guiding arrangement for insertion of the blade into the intermediate fastening element; and at least one through hole, extending transversely with respect to the direction of the guiding arrangement and intended for insertion of a retractable pin which, when the pin is inserted, acts as a retaining element for the blade with respect to the intermediate fastening element such that the arrangement enables the user/operator to manually replace and/or reset the tilling blade, avoiding any need for accessory tools commonly used for this purpose.

3 Claims, 2 Drawing Sheets

Fig. 1
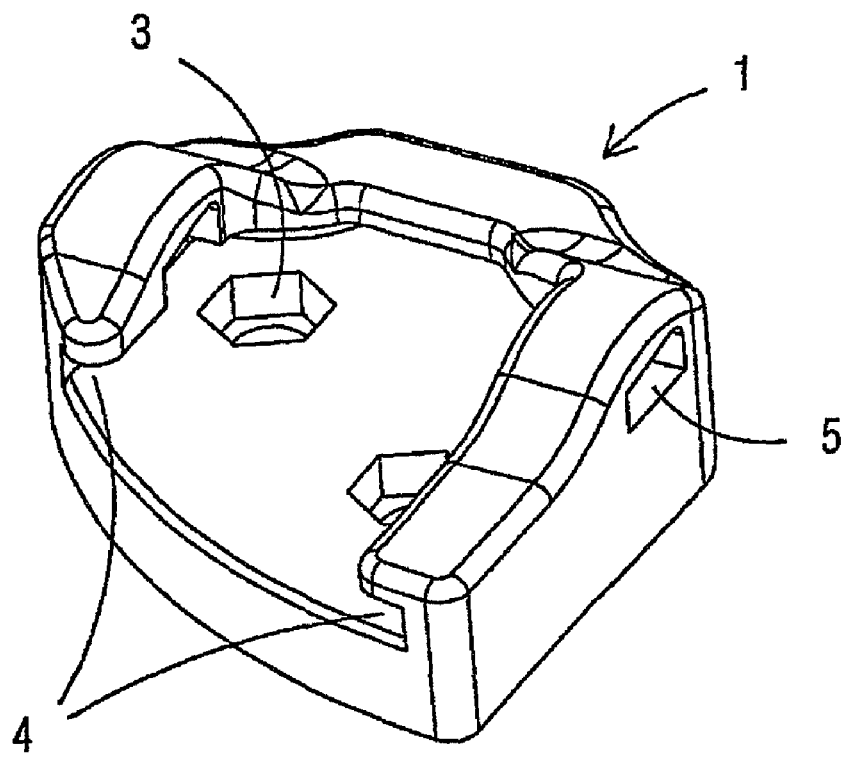
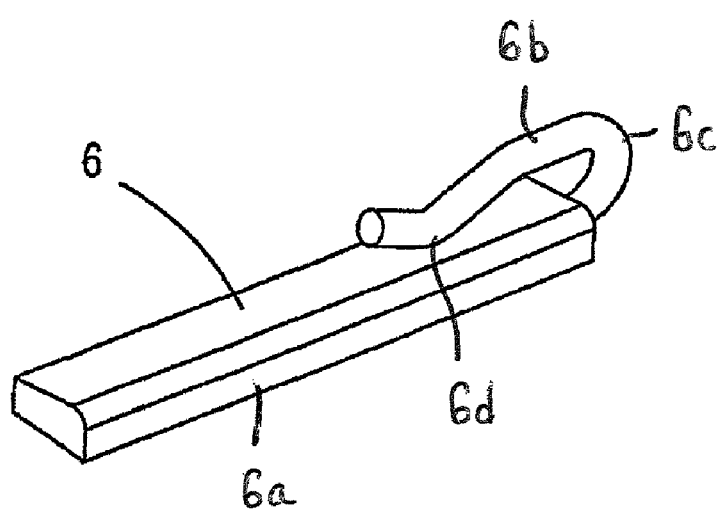
Fig. 2

US 8,037,943 B2

FASTENING DEVICE FOR COUPLING OF BLADES IN AGRICULTURAL CULTIVATION MACHINES

AIM OF THE INVENTION

The aim of this patent of Invention application is the registration of a fastening device for coupling of blades in agricultural cultivation machines, particularly, milling or tilling type cultivation machines, which includes important innovative elements and advantages over current fastening device arrangements used for the same purpose.

More specifically, the device of the invention allows the user-operator to changeover and/or replace the cultivation blade through a simple manual action, without using accessory tools such as specific wrenches, hammers, etc., commonly used for this purpose.

BACKGROUND TO THE INVENTION

At present, agricultural cultivation machines, particularly milling and tilling type cultivation machines, comprise a frame provided with a plurality of rotary plates on which blades are attached or linked.

Particularly, the cutting movement of said blades is rotary since the blades are arranged on the diameter of a rotary plate that is integral with a transmission shaft of said rotary movement.

It is known that said blades are linked to the rotary plates by means of common screws, which implies using auxiliary tools for changing or replacing the blades, or, screws with special properties that are particularly designed for this function, and which require a specific type of tool for handling.

The fastening device for coupling of blades in agricultural cultivation machines, which is the object of this invention, resolves the previously mentioned drawbacks, and also provides other additional advantages that will become evident from the following attached description.

The device of the invention is particularly designed for milling or tiller type cultivation machines, wherein the blades are linked on a rotary plate that is part of the actual machine in question. In particular, the cutting movement of said blades is rotary as they are arranged on the diameter of a rotary plate that is integral to a transmission shaft of said rotary movement.

To this end, and more specifically, said arrangement is characterized by the fact that it comprises an intermediate fastening element, made up of a solid body, which links the blade to the rotary plate; with said intermediate fastening element being provided with fastening means for linking it to the rotary plate; guiding means for inserting the blade in the intermediate fastening element; and at least one through hole transverse to the direction of the guiding means, intended for inserting a removable pin which, in an inserted position of said pin, acts like a retention element for the blade with respect to the intermediate fastening element.

According to the characteristics mentioned, the guiding means for inserting the blade consist of at least two opposite grooves arranged partially along the perimeter on the contact face of the solid body with the blade. This way the blade remains inserted inside the guiding means, except for the attacking area or area used for tilling.

Based on the characteristics described, the fastening means of the intermediate attachment element to the rotary plate consist of at least one bore hole for inserting a fastening screw that links the intermediate fastening element to the rotary plate.

Advantageously, and by virtue of the particular characteristics of the described invention, a device is obtained which makes it possible to change the tilling blade manually, without using auxiliary tools (wrenches, hammers, etc.).

It allows for the changeover or replacement of said blade owing to wear or breakage thereof by simply acting manually on the pin that acts as a retaining element.

In order to complete the following description, and to facilitate the comprehension of the characteristics thereof, a sheet of drawings accompanies this specification, which are an illustrative, non-limiting example of the most relevant details of the invention.

BRIEF DESCRIPTION OF THE DRAWINGS

FIG. 1 corresponds to a perspective view of the intermediate fastening element according to the characteristics of the invention;

FIG. 2 corresponds to a perspective view of the pin of the invention; and

DESCRIPTION OF A PREFERRED EMBODIMENT

Figure 3:
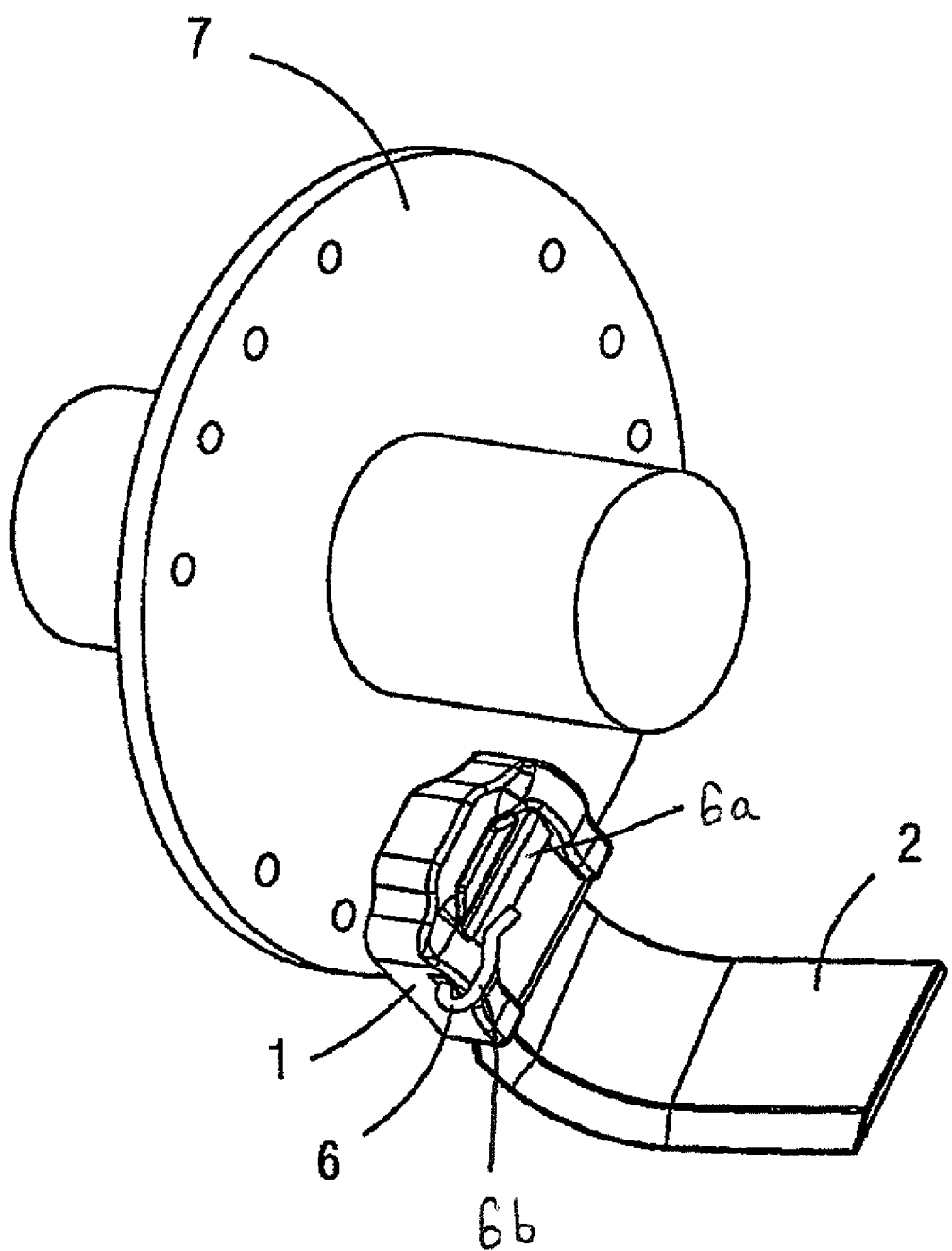
FIG. 3 corresponds to a perspective view of the intermediate fastening element shown in the first figure in a working position on the rotary plate.

The mentioned figures and numbering show a preferred but not exclusive embodiment of the invention, which consists of a fastening device for coupling of blades in agricultural cultivation machines, particularly, milling and tilling type cultivation machines.

In particular, the blades are mounted on the diameter of a rotary plate, and hence the blades have a rotary cutting movement, with said plate being integral with a transmission shaft of said rotary movement.

As shown in FIGS. 1, 2 and 3, the invention arrangement is characterized in that it comprises an intermediate fastening element (1), made up of a solid body, which links blade (2) to rotary plate (7); with said intermediate fastening element (1) being provided with fastening means (3) for linking it to rotary plate (7); guiding means (4) for inserting blade (2) into intermediate fastening element (1); and at least one through hole (5) transverse to the direction of guiding means (4), for inserting a removable pin (6) which, in an insertion position of said pin (6), acts as a retention element for blade (2) with respect to intermediate fastening element (1). The removable pin 6 has an R-shape with a linear portion 6a that extends into the one through hole 5, a V-shaped grasping portion 6b connected to one end of the linear portion 6a by a connecting portion 6c, and the V-shaped portion 6b is positioned above the linear portion 6a and the blade 2, and has a downwardly extending apex 6d.

According to the characteristics mentioned, and in the particular embodiment described, guiding means (4) for inserting blade (2) consist of at least two opposite grooves arranged partially along the perimeter on the contact face of the solid body with blade (2).

According to another aspect of the invention, fastening means (3) of intermediate fastening element (1) to rotary plate (7) consist of at least one bore hole for inserting a fastening screw that links intermediate fastening element (1) to the rotary plate.

Advantageously, and by virtue of the particular characteristics of the invention described, a device is obtained that makes it possible to changeover or replace the blade, owing to either wear or breakage, by simply acting manually on the pin that acts as a retention element.

The details, shapes, dimensions and other accessory elements, as well as the materials used to manufacture the fastening device for coupling of blades in agricultural cultivation machines of the invention, could be conveniently replaced by other technically equivalent elements without departing from the nature of the invention or the scope defined by the claims attached below.

What is claimed is:

1. Fastening device for coupling of blades in an agricultural cultivation machine, wherein the blades are linked on a rotary plate integral to the cultivation machine, comprising:
   an intermediate fastening element which attaches a blade to the rotary plate, said intermediate fastening element including:
   a solid body;
   a fastening arrangement for attaching the fastening element to the rotary plate;
   a guiding arrangement for inserting the blade into the intermediate fastening element, the guiding arrangement for inserting the blade including two opposite grooves arranged partially along a perimeter on a contact face of the solid body with the blade slidably retained within the grooves and with each groove including a portion that overlies the blade slid into the groove; and
   at least one through hole transverse to the direction of the guiding arrangement; and
   a removable pin removably insertable into the at least one through hole and which, in an insertion position of said pin, acts as a retention element for the blade with respect to the intermediate fastening element, said removable pin having an R-shape with a linear portion that extends into the one through hole, a grasping portion connected to one end of the linear portion by a connecting portion, and said grasping portion is positioned above through hole and said blade for removal of the pin manually without any accessory tool.

2. Fastening device for coupling of blades in an agricultural cultivation machine, according to claim 1, wherein the fastening arrangement includes at least one bore hole for inserting a fastening screw that connects the intermediate fastening element to the rotary plate.

3. Fastening device for coupling of blades in an agricultural cultivation machine, according to claim 1, wherein said agricultural cultivation machine is one of the following:
   a milling type cultivation machine; and
   a tiller type cultivation machine.

* * * * *